United States Patent
Kornylak

[15] 3,651,911
[45] Mar. 28, 1972

[54] GRAVITY CONVEYOR WITH ROLLERS HAVING ELASTOMERIC TIRES OF HIGH HYSTERESIS MATERIALS

[72] Inventor: Andrew T. Kornylak, 400 Heaton Street, Hamilton, Ohio 45011

[22] Filed: Feb. 16, 1970

[21] Appl. No.: 11,483

[52] U.S. Cl. .............................193/35, 29/121 R, 29/122, 152/313, 193/37
[51] Int. Cl. .............................................B65g 13/00
[58] Field of Search ..................193/37; 152/313; 29/121 R, 29/121 A, 122, 129, 130

[56] References Cited

UNITED STATES PATENTS

| 3,396,773 | 8/1968 | Alderfer | 152/313 |
| 3,443,674 | 5/1969 | Kornylak | 193/37 |

*Primary Examiner*—Evon C. Blunk
*Assistant Examiner*—I. Kenneth Silverman
*Attorney*—Jay M. Cantor

[57] ABSTRACT

A gravity conveyor comprising spaced parallel tracks mounting a series of rollers having tires of elastomeric material. The rollers comprise a rigid hub on which tires of polyurethane are mounted. The cross-sectional shape of the tires have annular zones of increasing area from the periphery toward the base to provide deformation of selected masses of elastomer under variable loaded conditions.

6 Claims, 9 Drawing Figures

PATENTED MAR 28 1972  3,651,911

INVENTOR
ANDREW T. KORNYLAK

BY Harold L. Halpert

AGENT

GRAVITY CONVEYOR WITH ROLLERS HAVING ELASTOMERIC TIRES OF HIGH HYSTERESIS MATERIALS

This invention relates to a conveyor and more particularly to a roller construction for a gravity conveyor.

Gravity conveyors consist essentially of a trackway having spaced parallel tracks mounting serially arranged rollers tor transporting a load. The trackway is supported at a preselected slope such that a load mounted on the rollers at the upper portion of the slope will be drawn down the trackway by the force of gravity. In order to control the speed of the load as it moves down the trackway, the rollers have been made of a rigid hub covered by an elastomeric tire of a material having a high hysteresis (or low coefficient of restitution) such as described in U.S. Pat. No. 3,443,674. The hysteresis effect of this material as it is deformed on a rigid hub operates to limit the speed of the load. However, the weight variations of load which can be controlled by a roller constructed in accordance with the patent is limited. If the rollers can provide proper control of the speed at one load, the hysteresis effect will not be effective with a load that varies too greatly from the designed load. IT is therefore an object of this invention to provide a conveyor having rollers which can control a wide range of loads.

It is a further object of this invention to produce a roller than can be made by a simple assembly process.

It is a further object of this invention to produce a roller in which the hysteresis effect can be selected.

These and other objects of the invention will become manifest upon reading the following description in conjunction with the accompanying drawing wherein.

In accordance with the invention the rollers comprise a hub and a tire of polyurethane mounted on the hub. The cross-sectional shapes of the tire are selected to provide a controlled flow of the elastomeric material in order to allow some of the energy which produces the change of shape of the tire to turn into heat and be dissipated. The change of energy into heat provides a braking effect on the load to limit the speed of the load under the influence of gravity. The cross-sectional shape is selected to provide deformation of selected masses of elastomer under a wide range of loads.

Figure 1:
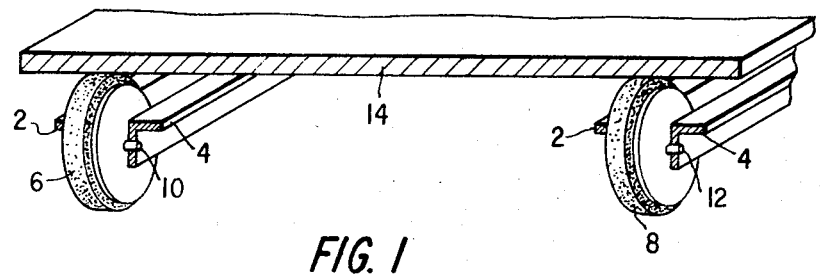
FIG. 1 is a lateral section of a gravity conveyor.

With reference to FIG. 1 there is disclosed a conveyor having a pair of trackways formed of spaced structural members 2 and 4 supporting a series of rollers 6, 8 for rotation about axles 10, 12. A pallet 14 is supported by a plurality of the rollers for movement down the slope of the trackways.

Figure 2:
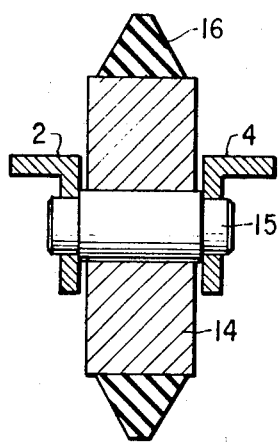
FIG. 2 is a section of a roller illustrating one form of the invention.

In FIG. 2 there is illustrated one form of roller for use in the trackways. The rolls comprises a rigid hub 14 rotatably supported on an axle 15 carried by the structural members 2, 4. An elastomeric tire 16 of polyurethane is adhered to the hub by any well known suitable adhesive. The cross section of the tire is in the shape of a trapezoid. The pallet loads will compress the tire in proportion to the load and will therefore vary the volume of polyurethane which is deformed. Thus, small loads will deform smaller volumes of material than heavy loads and the hysteresis effect of the material will always be consonant with the size of load.

Figure 3:
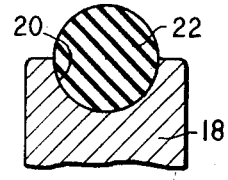
FIGS. 3–9 are segments illustrating other forms of the invention.

In FIG. 3 there is illustrated another modification in which the tire is compressed in accordance with the load to deform the proper volume of elastomer. in order to provide the proper hysteresis effect for the particular load. The hub 18 is formed with a peripheral annular substantially cylindrical groove 20 into which is fitted the tire 22 having a circular cross section. The tire is mounted by freely fitting it into the groove for a portion of the circumference and then stretching it sufficiently to slip the remainder into the groove.

Figure 4:
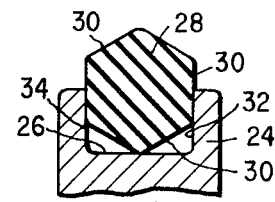
Figure 5:
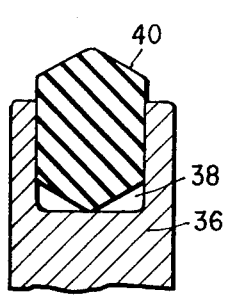
Figure 6:
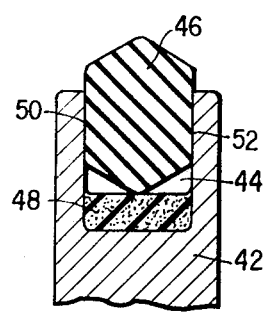

In FIGS. 4, 5, and 6 there are illustrated tires of hexagonal cross section. In FIG. 4 the hub 24 is provided with a rectangular groove 26 in the periphery into which is fitted a tire 28 having equal sides 30. The tire is mounted by fitting into the groove for a portion of the circumference and then is stretched and is allowed to snap into the balance of the groove in a manner similar to that of FIG. 3. The hysteresis effect in this tire is produced by the load and its reaction on the oppositely facing angles. A further braking effect is produced by the friction caused by the tire bearing against the horizon 32, 34 of the groove as the tire is deformed by the load.

In FIG. 5 the hub 36 is formed with a peripheral groove 38 into which is fitted a hexagonal tire 40. In this form of the invention the hexagon is of greater radial depth than lateral width and can be used with a material of greater elasticity than that of FIG. 4.

In FIG. 6 the hub 42 is formed with a peripheral annular groove 44 into which is fitted a hexagonal tire 46 similar to tire 40. An annulus 48 of a softer polyurethane than that of tire 46 is mounted in the groove for contact by an angle of the hexagon. In this form of the invention the braking effect is produced by the hysteresis of the tire and annulus and the friction of the tire against the sides 50, 52.

Figure 7:
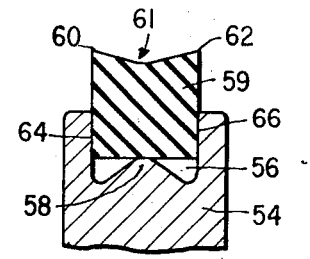

In FIG. 7 the hub 54 is formed with a peripheral annular groove 56 having an annular projection 58. The tire 59 is mounted in the groove in a manner similar to that of the tires previously described and is formed with a central groove 61 defining a pair of sharp edges 60, 62. The braking effect is produced by the hysteresis of the tire as it is deformed by the projection 58 and the pallet acting on the sharp edges and the friction of the tires against the sides 64, 66 of the groove.

Figure 8:
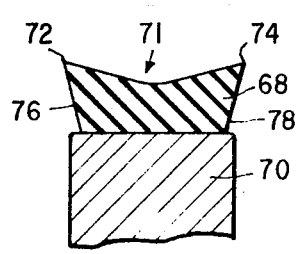

In FIG. 8, the tire 68 is adhered to the hub 70 by any well known adhesive and is formed with a central groove 71 defining sharp edges 72, 74 with the tapered sides 76, 78. The braking effect is produced by the hysteresis effect of the material which can be selected by selecting the dimensions of the groove and the taper of the sides.

Figure 9:
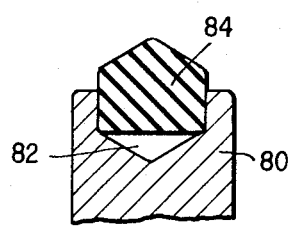

In FIG. 9 the hub 80 is formed with an annular peripheral groove 82 having a sunken bottom. The tire 84 of polyurethane is formed with a planar inner circumference and a peaked annular periphery. The braking effect in this form of the invention is produced by the hysteresis effect of the tire as it is deformed by pressure on the peak and flows into the bottom area of the groove 82. The friction against the sides of the groove is minimal because of the flow of the material toward the center of the bottom area.

A material for the tires having the desired properties is a polyurethane having a hardness range from 60 to about 87 Shore A and is produced through the reaction of certain polyisocyanates and polyhydroxy compounds to form a long chain, essentially linear macromolecule, which is then chain extended and cross linked to complete the reaction in a manner well known in the art.

I claim:

1. A conveyor comprising inclined spaced trackways and serially arranged rollers carried by each trackway, each roller comprising a rigid hub and an elastomeric tire of polyurethane mounted on the hub, the cross-sectional shape of each tire comprising annular zones of increasing area from the outer circumference toward the center, whereby to provide a tire having a hysteresis substantially directly proportional to the deformation under an applied load, the tire being mounted in a rectangular groove in the periphery of the hub and the cross section of the tire being a hexagon with opposite sides of the hexagon in contact with the sides of the groove.

2. A conveyor as defined in claim 1 further including an annulus of polyurethane mounted in the bottom of the groove with an angle of the hexagon in contact with the annulus.

3. A conveyor as defined in claim 2 wherein the annulus is of a softer material than the tire.

4. A conveyor roller comprising a rigid hub and an elastomeric tire of polyurethane mounted on the hub, the cross-sectional shape of the tire comprising annular zones of increasing area from the outer circumference toward the center, the tire being mounted in a rectangular groove in the periphery of the hub and the cross section of the tire being a hexagon with the opposite sides of the hexagon in contact with the sides of the groove.

5. A roller as defined in claim 4 further including an annulus of polyurethane mounted in the bottom of the groove with an angle of the hexagon in contact with the annulus.

6. A roller as defined in claim 5 wherein the annulus is of a softer material than the tire.

* * * * *